March 5, 1929.  A. R. CURTIS  1,704,532
BELT DRIVE
Filed April 23, 1923
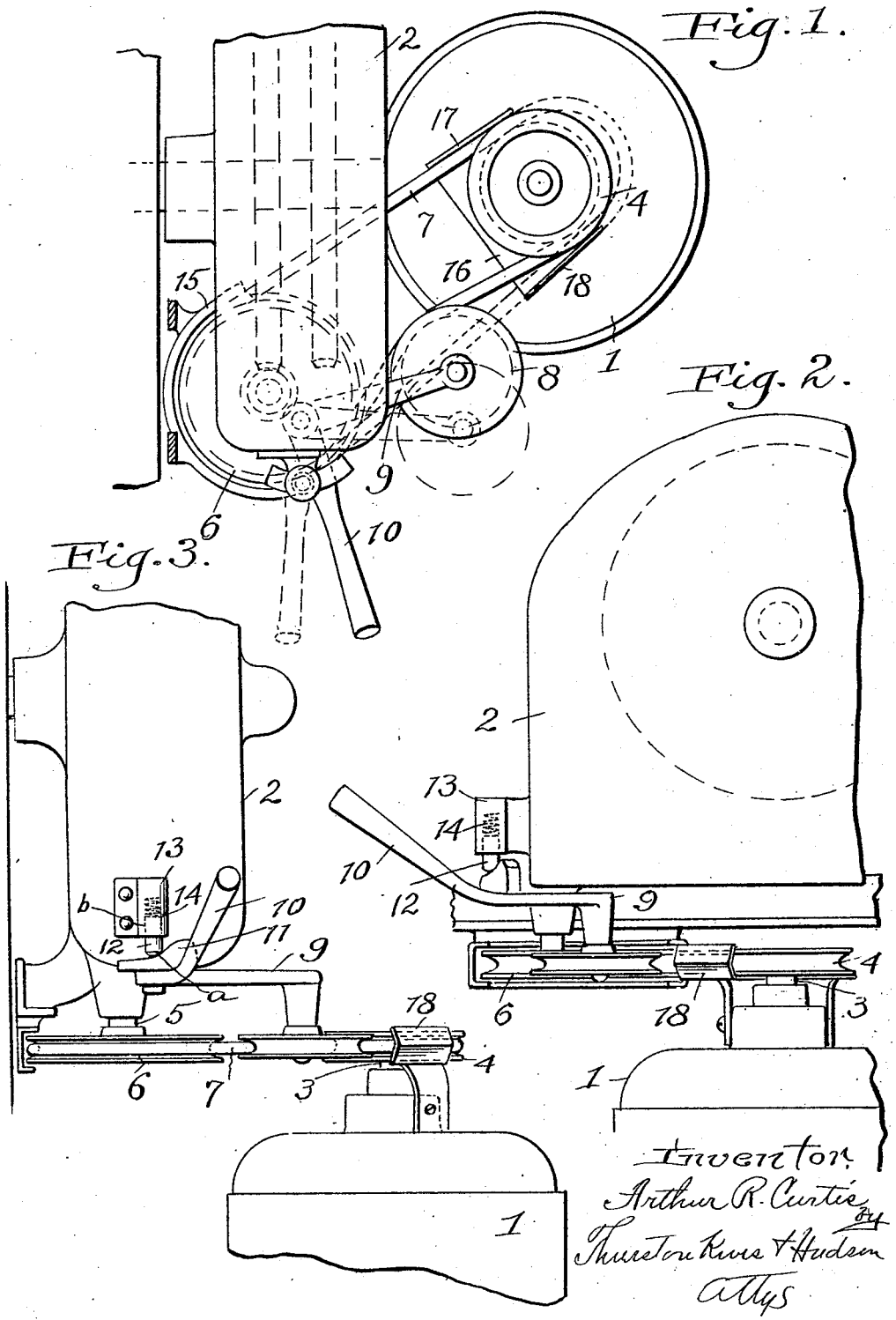

Patented Mar. 5, 1929.

1,704,532

UNITED STATES PATENT OFFICE.

ARTHUR R. CURTIS, OF CLEVELAND, OHIO.

BELT DRIVE.

Application filed April 23, 1923. Serial No. 633,972.

This invention relates to belt drives, and has for its object to provide means for tightening the belt and releasing the tension thereof and for disengaging the belt from one of its pulleys when its tension is released.

A further object is to provide a belt disengaging means which acts to expand the portion of the belt passing around the pulley out of contact with the pulley when the tension is released and to releasably hold the belt out of contact with the pulley in such position that the belt will move into engagement with the pulley when the belt is again tightened.

A further object is to provide a belt drive in which the belt and pulleys over which the belt passes are horizontally disposed and the driving connection between the pulleys is controlled by the actuation of a belt tightener.

A further object is to provide a belt drive in which the belt while in operation is maintained at a given tension and the tightening device is held against vibratory movements.

Other objects will be apparent from the following description and accompanying drawings.

The following description and accompanying drawings set forth in detail certain means embodying the invention the disclosed means, however, constituting but one of the various mechanical forms in which the principle of the invention may be employed.

Reference should be had to the accompanying drawings forming a part of this specification in which Fig. 1 is a top plan view of a belt drive embodying the present invention; Figs. 2 and 3 are end and side elevations respectively of the driving mechanism shown in Fig. 1. While the present invention is of quite general application, the belt drive herein shown is one designed particularly for operating a washing machine and is interposed between an electric motor 1 and automatic gearing for driving the washer cylinder alternately in opposite directions contained within the gear housing 2. The motor 1 is supported upon the frame work of the machine with the shaft 3 thereof disposed vertically and the motor shaft 3 has a grooved driving pulley 4 fixed to the upper end thereof. The mechanism within the gear housing 2 is driven through a vertically disposed shaft 5 which extends downwardly through the lower end of the housing and has a grooved pulley 6 fixed to the lower end thereof in horizontal alignment with the grooved pulley 4 at the upper end of the motor shaft. A belt 7 which is preferably round in cross-section passes around the horizontally aligned grooved driving and driven pulleys 4 and 6. A suitable belt tightener is provided for maintaining the proper amount of tension upon the driving belt 7 to prevent slipping of the belt during the operation of the machine. The belt tightener comprises a grooved horizontally disposed roller 8 which engages the belt 7 between the pulleys 4 and 6 and is carried upon the outer end of the arm 9 of a bell crank actuating lever, the other arm 10 of which forms the handle by means of which the lever is shifted to move the roller 8 into and out of engagement with the belt. The bell crank actuating lever is pivoted to the underside of the gear housing 2 and the outwardly extending handle 10 thereof has upon its upper side an acuate bearing cam 11 which is curved about the pivotal axis of the lever as a center. The upper inclined surface of the bearing cam 11 is engaged by a plunger 12 which is disposed vertically and is slidable in a bracket 13 attached to the side of the gear housing and is pressed downwardly into engagement with the cam 11 by a coil spring 14 bearing against the upper end thereof. The spring pressed plunger 12 acting upon the inclined surface of the cam 11 acts to shift the lever in a direction to move the roller 8 into engagement with the belt and to exert a pressure upon the roller 8 to apply a predetermined tension to the belt. Movement of the roller 8 away from the belt, however, is resisted not only by the force of the spring 14 but also by the frictional drag of the plunger 12 in the casing in which it slides, the inclined surface of the cam 11 when pressing outwardly upon the lower end of the plunger causing the plunger to bind in its casing so that a force greater than that required to overcome the tension of the spring is required to move the roller 8 in a direction to release the tension of the belt. When the cam 11 is pressed in a direction to tighten the belt, pressure at the rubbing point *a* of the plunger 12 on the cam is simply that of spring 14 and the pressure at the point indicated at *b*, in Fig. 3, between the plunger and its casing, is that due to the wedging action of the plunger against the inclined face of the cam minus the frictional drag at *a*, which latter makes the pressure and friction at *b* almost zero so that there is no appreciable frictional drag impeding the movement of the tightener toward the belt. When the tightener is pressed is a direction away from the belt, the pressure of the inclined face of the cam acting against the point *a* at the lower end of the plunger acts to press the plunger toward the point indicated at *a* in Fig. 3, greatly increasing the frictional resistance to the movement of the plunger in its casing so that a considerably greater force is required to move the tightener outwardly than that required to overcome the tension of the spring. Hence, a differential friction device is provided which offers almost no resistance to the tightening movement but which offers a substantial resistance to reverse movement. When the roller 8 is in engagement with the belt the plunger 12 is bearing upon the inclined portion of the cam 11 so that the roller 8 is constantly urged in a direction to tighten the belt and will move inwardly to take up any slack due to stretching of the belt. The frictional resistance to outward movement of the roller 8, however, serves to hold the roller against vibratory movements during the operation of the belt.

It will be noted that the inclined face of the cam 11 which is engaged by the plunger 12 has a varying inclination so that the pressure exerted by the spring 14 upon the tightener varies in different positions of the tightener. In Fig. 3 of the drawing, the tightener is shown in a position in which it has been moved inwardly to its full extent of movement in normal operation and in this position the plunger 12 is engaging at substantially the lowermost point of the inclined portion of the cam. It will also be observed that the curvature of the cam and the inclination thereof gradually decreases toward the uppermost part of the incline. The effect of the cam is to equalize the pressure transmitted from the spring to the tightener. The inclination of the portion of the cam, engaged by the plunger, gradually increases as the retainer moves inwardly so that the compression spring 14, while under less tension, will still exert substantially the same pressure against the belt by reason of the fact that the plunger is acting against the steeper portion of the surface of the cam.

While the frictional drag resisting outward movement of the tightener is sufficient to prevent vibratory movements of the tightener, it is not sufficient to prevent manual operation thereof or outward movement due to the shortening of the belt due to shrinkage.

An arcuate guard 15 which is channel-shaped in cross-section is arranged around the periphery of the pulley 6 closely adjacent the belt 7 with its flanges projecting inwardly over the upper and lower flanged edges of the pulley. The arcuate guide 15 serves to maintain the belt 7 in engagement at all times with the driven pulley 6 and to shift the slack of the belt when the tension thereof is released toward the driving pulley 4. Underneath the driving pulley 4 on the side of the shaft 3 toward the pulley 6 is a bracket 16 fixed to the upper end of the motor 1 and provided with belt engaging edge flanges 17 and 18 which are closely adjacent the belt 7 on opposite sides of the pulley 4. The flanges 17 and 18 are V-shaped in cross-section and converge slightly toward their outer ends. Whenever the tension of the belt 7 is released by moving the roller 8 out of engagement therewith, the slack of the belt 7 is shifted toward the pulley 4 by the arcuate guard 15 and the portion of the belt passing around the driving pulley 4 is thrown outwardly by centrifugal force and by its natural elastic expansion into engagement with the V-shaped flanges 17 and 18 which hold the belt entirely out of contact with the driving pulley 4. The V-shaped flanges 17 and 18 are arranged with the bottoms of the V's in the central plane of the adjacent pulley so that when the belt expands outwardly into engagement with the flanges, it is guided toward the bottoms of the V's and held in the plane of the grooves of the pulley so that it cannot rub against either flange of the pulley, the outward pressure due to the elasticity of the belt serving to firmly hold the belt in engagement with the flanges and out of contact with the pulley. When the roller 8 is again shifted to tighten the belt 7 the belt is instantly drawn out of engagement with the flanges 17 and 18 and into engagement with the peripheral groove of the driving pulley 4. It will thus be seen that the arcuate guide 15, together with the belt engaging flanges 17 and 18 provide means for automatically releasing the belt from the driving pulley 4 whenever the tension of the belt is released and that the belt holding flanges 17 and 18 are so disposed that upon reengagement of the belt tightener with the belt, the belt is drawn into engagement with the driving pulley. When a new belt is applied to the pulleys, its length will be just sufficient to provide the slack necessary to permit the belt to free itself from the pulleys when the tightener is released, and as the belt stretches in operation, the additional slack will be automatically taken up by the tightener which has a range of movement sufficient to take up whatever additional slack is formed by elongation of the belt.

Having described my invention, I claim—

1. A belt drive comprising a drive pulley, a driven pulley, a belt passing around said pulleys, a manually operable belt tightener engageable with the belt and adjustable to tighten the belt or release the tension thereof, an arcuate guide member outside the belt and closely adjacent the portion thereof engaging the circumference of the driven pulley, and converging belt engaging members on the outer sides of opposite runs of the belt and closely adjacent the drive pulley, said converging belt engaging members being normally out of contact with the belt but adapted to be engaged by the belt when the tension thereof is released to dispose the slack of the belt about the driving pulley whereby the belt is disengaged from the driving pulley.

2. A belt drive comprising a grooved driving pulley, a grooved driven pulley, a belt which is round in cross-section passing around said pulleys, a manually operable belt tightener adjustable to tighten the belt or to release the tension thereof, an arcuate guard outside the portion of the belt passing around the driven pulley and closely adjacent thereto, and a pair of belt engaging members outside the opposite runs of the belt closely adjacent the driven pulley, said belt engaging members having substantially V-shaped belt receiving portions in which the belt engages when the tension thereof is released and which coact with the belt to hold the same out of contact with the driving pulley.

3. A belt drive comprising a driving pulley, a driven pulley, a slack belt passing around both said pulleys, means for tightening and releasing the belt and belt holding members trough-shaped in cross-section positioned on opposite sides of one of the pulleys with the mid-center lines of the troughs lying in the mid-plane of the pulley.

4. A belt drive comprising a driving pulley, a driven pulley, a belt passing around said pulleys, a tensioning device for said belt including a cam, a spring pressed actuating member co-acting with the sloping face of said cam to actuate the tensioning device in a direction to tension the belt, said tension tending to vary with change in the position of the tensioning device, said cam having variations in its slope to maintain a substantially constant tension in the belt regardless of the position of the tensioning device.

5. A belt drive comprising a driving pulley, a driven pulley, a belt passing around said pulleys, a tensioning device for said belt having a pulley adapted to engage the same, said device having a cam, a spring pressed member co-acting with the sloping face of the cam to apply pressure to the pulley to tension the belt, the slope of said cam being so varied on different portions thereof as to give predetermined pressures on the pulley for successive positions of the tensioning device.

6. A belt drive comprising a driving pulley, a driven pulley, a belt passing around said pulleys, a swinging tensioning device for said belt carrying a pulley adapted to engage the same, said device having an arcuate cam, and a spring pressed member co-acting with the sloping face of said cam to apply pressure to the pulley to tension the belt, the slope of said cam being so varied as to give predetermined pressures on said pulley for successive positions of the tensioning device.

7. A belt drive comprising a driving pulley, a driven pulley, a belt passing around said pulleys, a belt tightener engaging said belt, a spring acting inwardly upon said tightener to exert pressure upon the belt to tighten the same, and frictional means acting on the tightener for exerting a drag thereon upon outward movement thereof whereby vibratory movements of the tightener during the operation of the belt are prevented.

8. A belt drive comprising a drive pulley, a driven pulley, a belt passing around said pulleys, a tightening roller engageable with one run of the belt, a lever connected with the roller to shift the same to and from tightening position, a spring acting upon said lever to move the same in a direction to tighten the belt, and frictional means interposed between said lever and spring for exerting a frictional drag upon the movement of the lever in the opposite direction whereby vibratory movements of the tightening roller are prevented.

9. A belt drive comprising a driving pulley, a driven pulley, a belt passing around said pulleys, and a belt tightener comprising lever carrying a roller engageable with the belt, said lever having an arcuate inclined bearing surface, and a spring pressed plunger engaging said arcuate bearing surface and acting to shift the lever in a direction to press the roller against the belt.

10. A belt drive comprising a driving pulley, a driven pulley, a belt passing around said pulleys, a pressure operated means for tensioning the belt having frictional resistance therein opposing movement thereof, automatic means to cause the frictional resistance to movement in a direction to release the belt to be greater than the resistance to movement in a direction to tension the same, and pressure compensating means to maintain a substantially constant tension in said belt.

11. A belt drive comprising a driving pulley, a driven pulley, a belt passing around said pulleys, a belt tightener engaging said belt, said tightener comprising a movably mounted member carrying a roller engaging the belt, said member having an inclined bearing surface, a pressure applying means, a plunger associated with said pressure applying means and acting on the inclined surface to shift the tightener toward the belt.

12. A belt drive comprising a driving pulley, a driven pulley, a belt passing around said pulleys, a belt tightener engaging said belt, said tightener comprising a movably mounted member carrying a roller engaging the belt, said member having an inclined bearing surface, which has portions of different inclinations, a pressure applying means, a plunger associated with the pressure applying means and acting on the inclined surface to shift the tightener towards the belt.

In testimony whereof, I hereunto affix my signature.

ARTHUR R. CURTIS.